(12) United States Patent
Shukla et al.

(10) Patent No.: US 11,190,641 B1
(45) Date of Patent: Nov. 30, 2021

(54) AUTOMATED AGENT BEHAVIOR RECOMMENDATIONS FOR CALL QUALITY IMPROVEMENT

(71) Applicant: Capital One Services, LLC, McLean, VA (US)

(72) Inventors: Nagendra Shukla, West Chester, PA (US); Joel Bricker, Hockessin, DE (US); Brian Abbott, Kennett Square, PA (US); Bradley Hardwick, Philadelphia, PA (US); Sean Dickert, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/038,216

(22) Filed: Sep. 30, 2020

(51) Int. Cl.
*H04M 3/00* (2006.01)
*H04M 3/51* (2006.01)
*G06F 40/279* (2020.01)
*G10L 15/22* (2006.01)
*G10L 15/30* (2013.01)
*G10L 15/08* (2006.01)

(52) U.S. Cl.
CPC ........ *H04M 3/5175* (2013.01); *G06F 40/279* (2020.01); *G10L 15/08* (2013.01); *G10L 15/22* (2013.01); *G10L 15/30* (2013.01); *H04M 2203/401* (2013.01); *H04M 2203/403* (2013.01)

(58) Field of Classification Search
CPC .... H04M 3/5175; H04M 3/51; H04M 3/5183; H04M 3/523
See application file for complete search history.

(56) References Cited

U.S. PATENT DOCUMENTS

| | | | |
|---|---|---|---|
| 10,635,695 B2 | 4/2020 | Seth et al. | |
| 10,645,224 B2 | 5/2020 | Dwyer et al. | |
| 10,652,391 B2 | 5/2020 | Miller et al. | |
| 2019/0166403 A1* | 5/2019 | Yelton | G10L 15/08 |
| 2019/0253558 A1 | 8/2019 | Haukioja et al. | |
| 2020/0111377 A1 | 4/2020 | Truong et al. | |

* cited by examiner

*Primary Examiner* — Rasha S Al Aubaidi
(74) *Attorney, Agent, or Firm* — Sterne, Kessler, Goldstein & Fox P.L.L.C.

(57) ABSTRACT

Disclosed herein is a method for automated agent behavior recommendations for call quality improvement. The method performed at a server includes receiving a first data record and a second data record of a plurality of data records, each comprising communication between a first party and a second party and determining a first communication originated from the first party. The method includes determining a category for each section of the plurality of sections of the first communication, and a plurality of behavior distances between different categories associated with the plurality of sections. The method includes augmenting first metadata of the first data record and second metadata of the second data record to include associated behavior distances and determining an average performance ranking of the first party to generate a recommendation to increase the average performance ranking of the first party above a preconfigured threshold.

20 Claims, 8 Drawing Sheets

AUTOMATED AGENT BEHAVIOR RECOMMENDATIONS FOR CALL QUALITY IMPROVEMENT

BACKGROUND

Large amounts of transactions are handled by call centers, where a trained call center associate handles voice calls from various customers regarding different services. However, if a call center associate is not able to provide services to customers above a specific performance threshold, then the call center and the company for which the call center is providing services to the callers, are adversely affected.

To improve the performance of call center associates, currently available solutions are minimal. For example, to improve the performance of call center associates, a human operator, such as a call center trainer, listens to a sample set of calls handled by the call center associate, and analyzes the calls in the context of predefined guidelines. Based on the analysis of the sample set of calls, the call center trainer recommends behavior changes to the call center associate. However, due to the subjective and varying nature of such analysis, the quality of the recommendations also varies even under similar circumstances.

SUMMARY

Embodiments provide automated agent behavior recommendations for call quality improvement. In one embodiment, a method is disclosed and performed by a server. The method includes receiving a first data record and a second data record of a plurality of data records, each data record comprising communication between a first party and a second party. The method includes determining a first communication originated from the first party, the first communication comprising a plurality of sections, and determining a category for each section of the plurality of sections of the first communication. The category is selected from a plurality of different categories. The method includes determining a plurality of behavior distances between different categories associated with the plurality of sections and augmenting first metadata of the first data record and second metadata of the second data record to include associated behavior distances. The method includes determining an average performance ranking of the first party based on an analysis of the first metadata and the second metadata. The method includes generating one or more recommendations for the first party to increase the average performance ranking of the first party above a preconfigured threshold. The first data record or the second data record may include start times and end times of an event from a set of events, including spoken or written communication between the first party and second party.

The method may also include determining the first communication originated from the first party by determining availability of a communication channel for the first party in the first data record or the second data record. In response to determining that the communication channel for the first party is unavailable in the first data record or second data record, each spoken or written word of a plurality of spoken or written words exchanged between the first party and the second party is classified. The plurality of spoken or written words may be exchanged over a plurality of communication channels. The method may also include determining a channel of the plurality of communication channels over which a number of spoken or written words identifying the first party based on a predetermined set of words exceeds a predetermined threshold value. The communication originated from the first party is separated from the communication originated from the second party based on the determined channel. The plurality of categories may include a salutation by the first party, an acknowledgment by the first party, an inquiry by the first party, validation by the first party, or advice by the first party.

The method may also include determining the category for each section by using a machine-learning model to identify a category for each section of the plurality of sections. The method may also include determining the average performance ranking further by analyzing the first metadata and the second metadata based on a policy associated with a set of organizational guidelines. The method may also include facilitating training material for the first party, wherein the training material corresponds to the one or more recommendations generated for the first party to increase the average performance ranking of the first party above the preconfigured threshold.

An apparatus and computer-readable medium embodiments are also disclosed.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Improving customer service over a communication channel involves an intricate analysis of several factors that come into play between the customers, such as customers calling over a phone line, and call center associates serving the customers. Analyzing conversations that take place between the call center associate and a customer plays a significant role in determining what can be improved further to enhance the customer's experience. This requires an organization, such as a call center, to employ resources for carefully assessing as many conversations as possible and providing recommendations to the call center associate for improving their call-handling performance. Such an assessment requires deep human expertise. The analyzer needs to judge the level of knowledge possessed by the call center associate, the complexity of the matter being attended to by the call center associate, and the stress level being managed during that conversation, and recommend the areas of improvement to the call center associate. The method proposed in the present disclosure describes several scenarios prevalent in a typical call center. The present disclosure also relates to a unique way of setting up a fully automated process that may suggest improvements to the call center associate in real-time.

Various embodiments of this disclosure will be discussed with respect to the corresponding figures.

Figure 1:
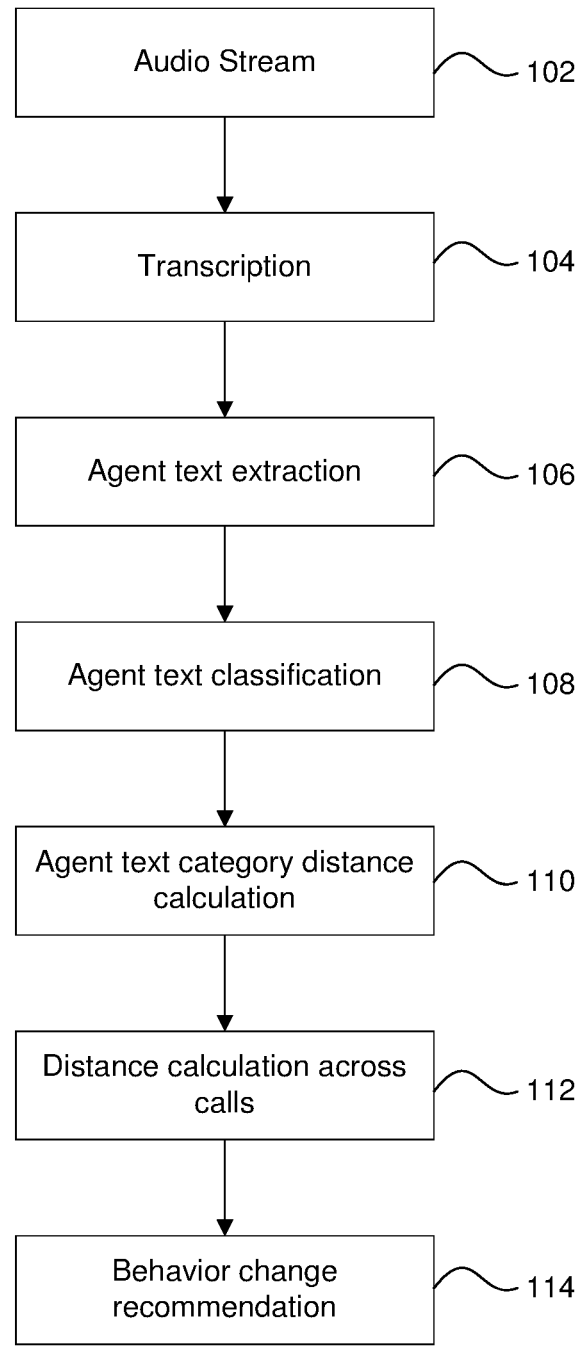
FIG. 1 illustrates a high-level flow of a method for automated agent behavior recommendations, according to some embodiments.

FIG. 1 illustrates a high-level flow of a method for automated agent behavior recommendations, according to some embodiments. As shown in FIG. 1, the process of recommending a better call center associate or agent behavior may be described by using key building blocks including audio stream 102, transcription 104, agent text extraction 106, agent text classification 108, agent text category distance calculation 110, distance calculation across calls 112, and behavior change recommendation 114. Each of these building blocks is described in detail below.

Audio Stream

The audio stream 102 represents one or more streams of audio from one or more stored calls, or a real-time channel that may include the agent's voice. By way of a non-limiting example, the recorded calls may include two channels. One channel may include the voice of the agent, and the other channel may include the voice of the customer or caller. Because data purity may play a significant role, the agent needs to be consistently present in one of the two channels. Accordingly, audio stream 102 may include the voices of the customer and the agent alone. The channel, including the agent's voice, may need to be known, or the channel, including the agent's voice, may be determined based on the analysis of the content in both the channels. The channel including the agent's voice may need to be identified during the early stages of the call so that the agent's interaction with the customer can be analyzed from the beginning of the call, e.g., from receipt of the call by the agent and subsequent greeting of the customer by the agent. In this way, analysis of the agent's performance can be performed upon the instantiation of a call, and the entirety of the communication may be assessed.

Transcription

Transcription 104 represents a process that converts voice from the recorded audio into text. By way of a non-limiting example, techniques, such as KALDI—Active Speech Recognition—may be used for audio to text conversion. However, a person skilled in the art may use other available techniques for audio to text conversion. In accordance with some embodiments, the text generated from audio to text conversion may be separated based on the channel on which the particular audio is present. The generated text may also indicate timestamps corresponding to the utterance statements. The generated text may be forwarded to agent text extraction block 106.

Agent Text Extraction

The agent text extraction 106 separates the agent's text from the customer's text. By way of a non-limiting example, a script may be employed to extract the utterances that belong to the agent from the utterances that belong to the customer. The separation of the agent's utterances from the customer's utterances may be identified and timestamped respectively.

Agent Text Classification

The agent text classification 108 may receive its input from the agent text extraction 106, and classify each utterance into a category of a plurality of categories. Each category may correspond to a different behavior area under analysis that may be required to be improved. A behavior area corresponds to a specific type of communication between the customer and the agent and the agent's performance level with respect to that type of communication. By way of a non-limiting example, different behavior areas may include an agent's performance level with respect to a salutation by the agent, an acknowledgment of the customer's issue, an inquiry by the agent for additional information, a validation of the information received from the customer, and/or advice given by the agent to the customer regarding the customer's issue reported during the call by the customer. The classification of the utterances into one or more categories may be performed using a machine-learning model. In a typical contact center set up, the agents are required to follow certain norms and guidelines when talking with customers. These norms and guidelines include certain words or groups of words that induce standards in their communication. In practice, agents are trained to use these words in addressing a certain scenario. This step utilizes the presence of those words (or similar words) in ascertaining the category of that particular utterance. As an example, an agent text category can be 'Agent Salutation' when the agent greets the customer in the call or 'Agent Inquiry' when the agent inquires about a problem.

Agent Text Category Distance Calculation

The agent text category distance calculation 110 may determine a time distance, which is the amount of time that has elapsed between different categories of utterances from the agent based on the timestamp assigned to each utterance in the transcript. By way of a non-limiting example, in some embodiments, a time distance between multiple categories or events during the call may also be measured as a time difference between the occurrence of the events. Events may be generated based on state changes during the conversation between the agent and the customer. The measured time distance may be analyzed as a part of the behavior analysis. The measured distance may also be stored as call metadata for distance calculation across calls 112.

Distance Calculation Across Calls

The distance calculation across calls 112 may measure a time distance between utterance categories within a call. By way of a non-limiting example, in some embodiments, a time distance between an agent salutation category and an agent inquiry category in the call may be measured. In addition, an order of a sequence of system events that occurred during the call may also be determined. For example, based on the interaction between the customer and the agent, a specific system event may take place, for example, ordering a debit or credit card, ordering a bank statement on behalf of the customer, etc. Such system events may be recorded and marked with a timestamp of when the system event occurred. Accordingly, whether an agent's utterances corresponding to a certain behavior category, as described above, occur before or after a system event may be captured as part of that call or agent communication. In this way, the system is able to determine what actions occur in response to certain utterance categories, and this information can be used to assess the agent's performance. This process may be repeated across a plurality of calls, and the result, when assimilated across the plurality of calls, would allow a percentile distribution for that particular agent behavior. The percentile distribution for the agent behavior may be determined based on a comparison of the agent behavior for the utterance category with a performance of a plurality of agents in the same utterance category. Based on the comparison, the agent's performance may be ranked using a percentile distribution method.

Behavior Change Recommendation

In an embodiment, metadata of the call may be captured and analyzed. Based on the analysis of the metadata of the call, behavior change recommendation 114 may recommend how an agent could improve his performance by making a change in his communication with the customer for a specific behavior category of the agent. Metadata from the call may be considered first to determine an utterance classification result that ascertains the applicability of the behavior to the call and specific scenarios. Depending upon the certainty of the application of utterance classification results meeting a certain threshold, changes in behavior may be recommended to the agent.

By way of a non-limiting example, an agent whose utterance classification results are below a predetermined threshold indicates that the agent's performance level is below the corporate or legal standards. This may indicate, for example, that the agent is not giving proper responses to customer inquiries. Accordingly, based on the analysis of a plurality of calls between the agent and one or more customers, recommendations may be made to the agent, and appropriate training material may be recommended. The recommendations may be made with specific targets or goals for the agent. For an agent that is on the lower side of the percentile distribution, the recommendation process may retrieve the relevant training material that may help the agent improve his/her subject matter expertise related to the identified problem areas. The relevant training materials may be specific to the topic of the calls, where the agent's performance is not up to standard. Embodiments of this analysis may be supported by using other models that specialize in identifying contextual information regarding the calls and topics of discussion.

In some embodiments, it may be required that the audio, including the agent behavior during the audio-based communication, be made available for processing. For example, the call centers may record and store the audio of customer calls for a certain amount of time. These recorded calls may be subjected to a text conversion process such as transcription. In a larger organization, this process may require multiple computational resources to convert calls to text in parallel such that all the calls may be converted to text in real-time or within a meaningful interval. The calls may be transcribed using active speech recognition mechanisms based on machine learning models that can convert voice to text independent of the speaker's accent. The transcription process may also be aware of the timing information of the recorded call so that it can print time stamps next to every utterance in the call.

Figure 2A:
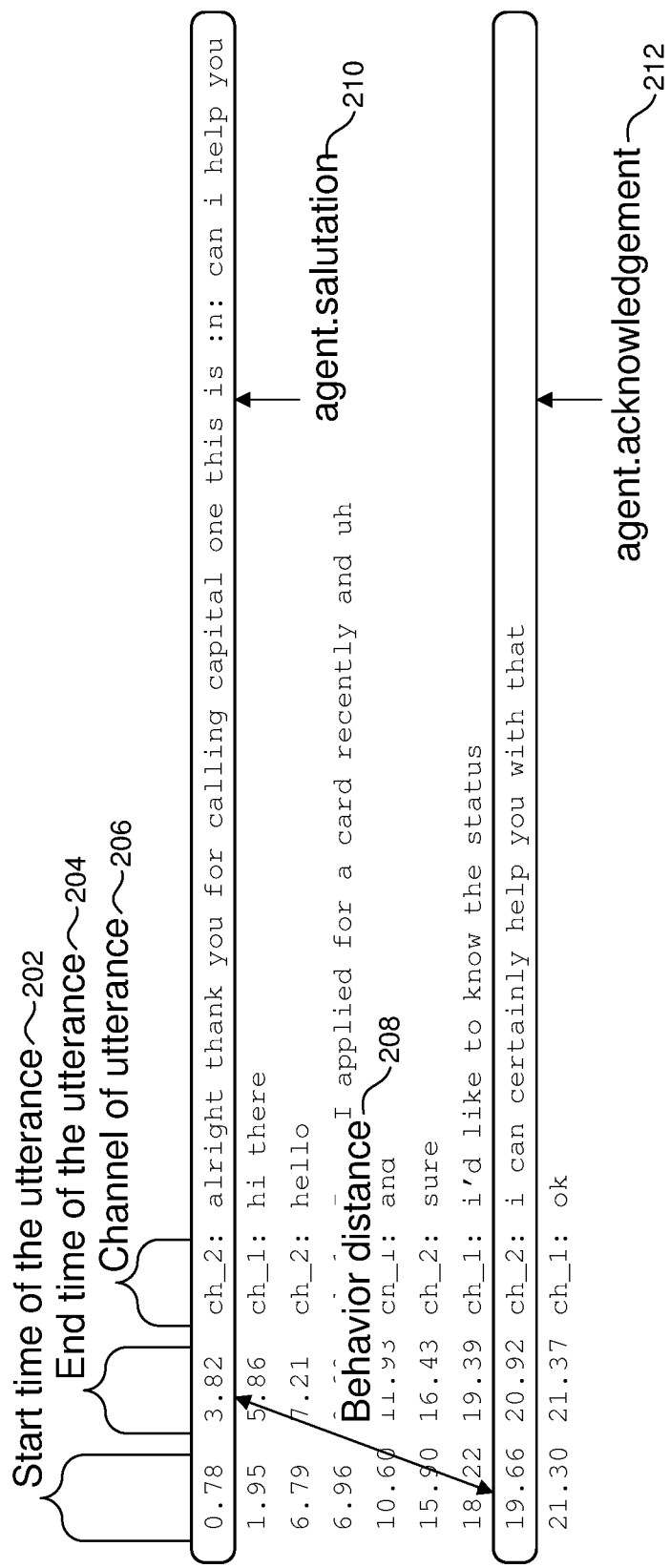
FIG. 2A illustrates a sample transcript, according to some embodiments.

FIG. 2A illustrates a sample transcript, in accordance with some embodiments. Sample transcript 206 illustrates a transcript of communications between a customer and an agent of a call-center. For example, a customer may initiate a call to a call-center to inquire about assistance regarding a consumer product. An agent at the call-center is trained to receive such calls, engage with, and assist the customer based on the inquiry. Sample transcript 206 illustrates the utterances (individual words or group of words) that are communicated between the customer and the agent during such a call. As shown in FIG. 2, in the sample transcript, the channel of utterance 206 column indicates that a customer may be talking on channel 1, which may be denoted as ch_1, and the agent may be talking on a second channel, which may be denoted as ch_2. Further, for each utterance of speech by either the customer or agent, a start time of the utterance 202, an end time of the utterance 204, and channel of utterance 206 may be provided. By way of a non-limiting example, the start time of the utterance 202 and the end time of the utterance 204 may be in milliseconds. In some embodiments, the text may be made compliant with privacy rules by removing the names and telephone numbers from the entire conversation before the final transcript is made available for consumption. As shown in FIG. 2A, the transcript also indicates the assignment of an utterance category to individual words or groups of words, such as agent.salutation 210 and agent.acknowledgement 212. These utterance categories identify the type of communication between the agent and the customer, such as a greeting or an acknowledgment of a customer inquiry. In an embodiment, a time distance between these two utterance categories is measured and shown as a behavior distance 208. A time distance is a measurement of time or the time gap between utterances or events belonging to two different utterance categories.

Figure 2B:
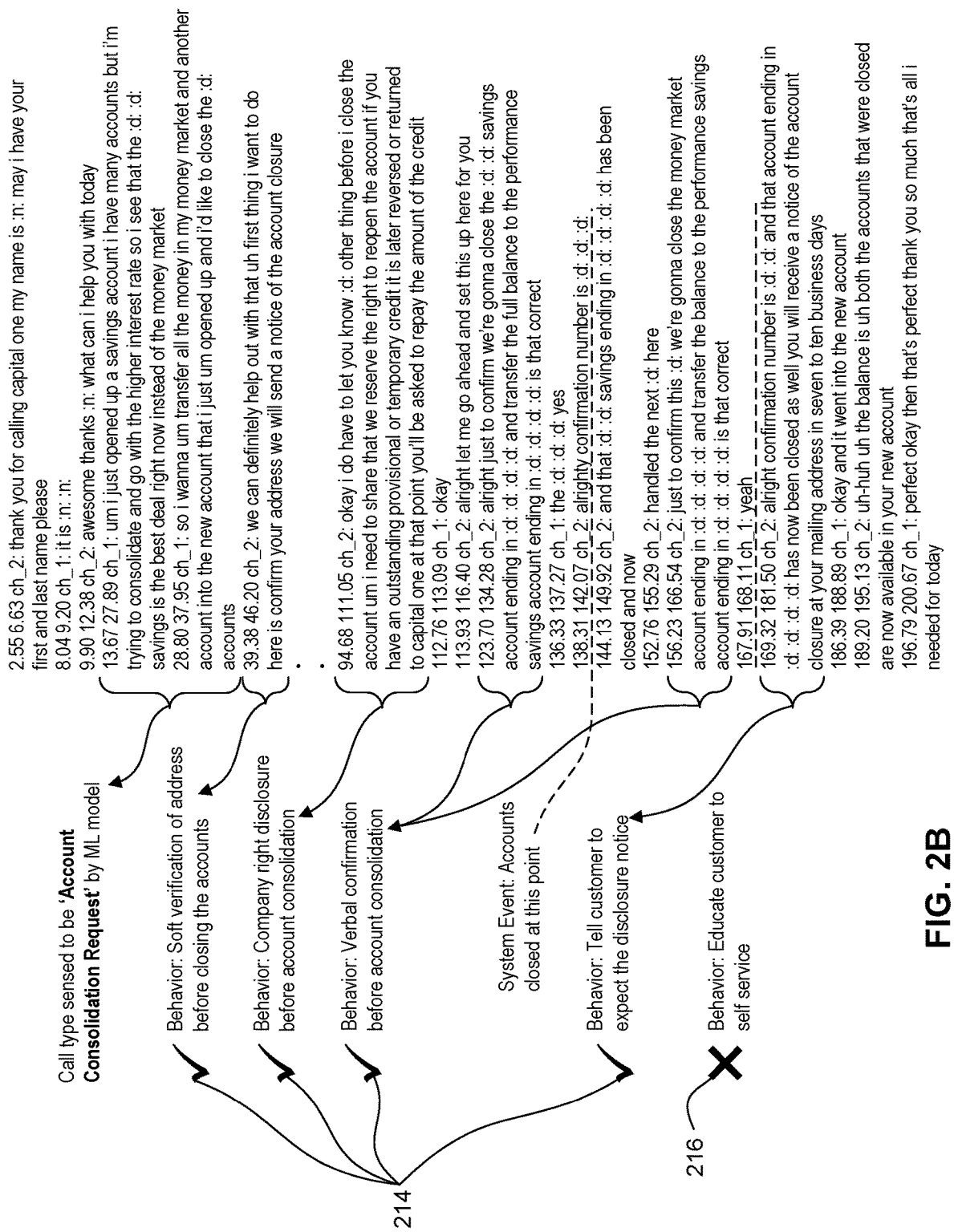
FIG. 2B illustrates a plurality of behaviors analyzed for agent performance improvement recommendations, according to some embodiments.

FIG. 2B illustrates an example of a plurality of behaviors that are analyzed for an agent's performance improvement recommendation, according to some embodiments. As shown in FIG. 2B, consistent with the description for FIG. 2A, utterances of the agent are classified into various utterance categories. Based on the analysis of each utterance made by the agent, a call type may be determined. By way of a non-limiting example, the call type may be determined using a machine learning model. The machine-learning model is described in detail below. Based on the analysis, for the utterances shown in FIG. 2B, the call type may be determined as an "Account Consolidation Request." Accordingly, for each utterance category, one or more behavior aspects for the utterance category may be analyzed to determine recommendations for performance improvement for the agent. By way of a non-limiting example, for the detected call types of "Accounts Consolidation Request," behaviors such as address verification, disclaimer or disclosure statements, requests to accept disclaimer or disclosure statements, receipt of verbal confirmation before consolidating accounts, and/or educating the customer etc. may be analyzed. Based on the analysis of the behaviors corresponding to the call type, it may be determined that the agent met expectations for behaviors 214 such as address verification, disclaimer or disclosure statements, requesting to accept disclaimer or disclosure statements, and receiving verbal confirmation before consolidating accounts. However, as illustrated in FIG. 2B, it may be determined that the agent failed to meet performance expectations for behavior 216 which relates to educating the customer. Accordingly, for behavior 216, the performance improvement recommendations may be proved to improve the agent's performance for this specific behavior. In an embodiment, the performance improvement recommendations may include, for example, additional training or reading materials.

Figure 3:
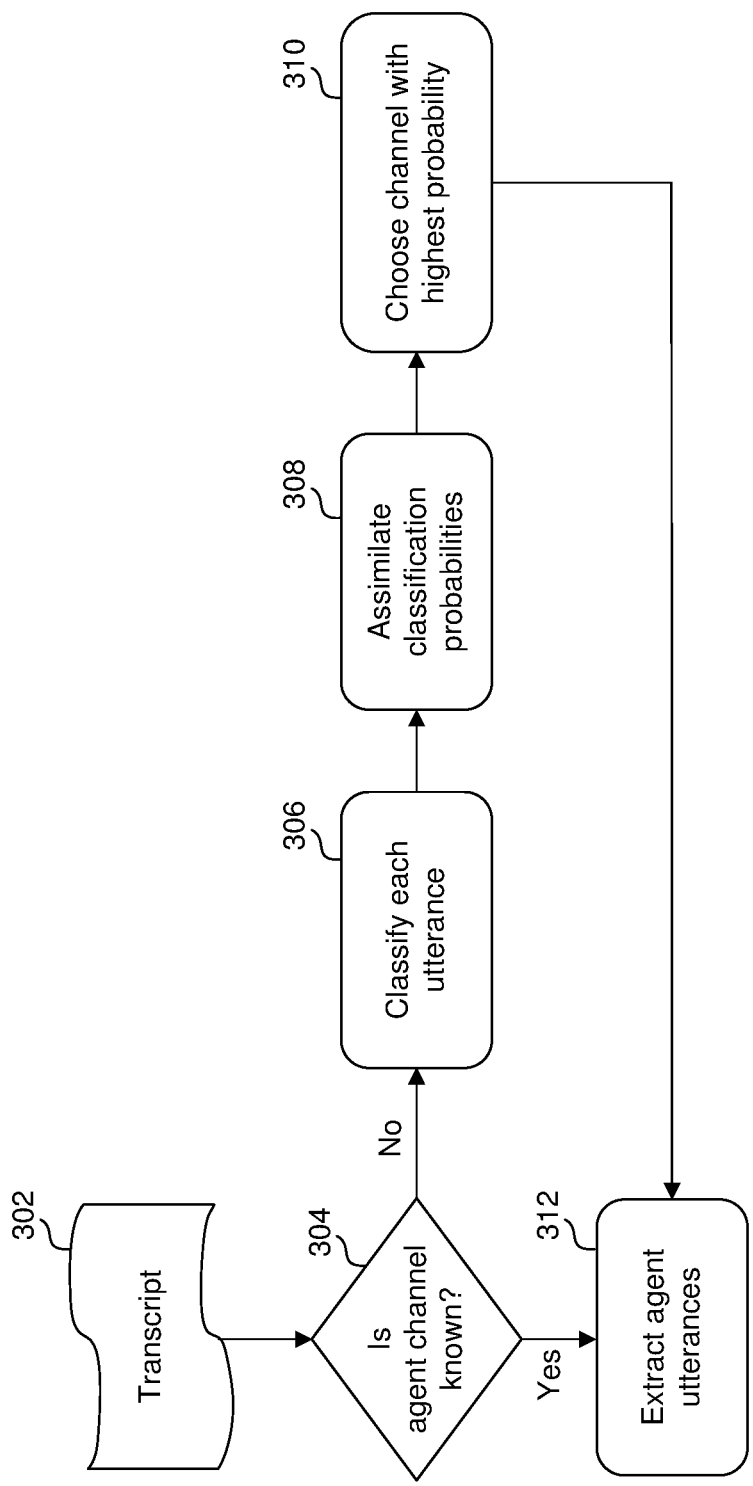
FIG. 3 illustrates a flow chart for extracting agent utterances, according to some embodiments.

FIG. 3 illustrates a flow chart for extracting agent utterances, according to some embodiments. As shown in FIG. 3, once transcript 302 is available, if the agent's channel 304 is known, all text from that particular channel may be extracted, as shown at step 312. Extraction of all text from the agent's channel may be performed by employing logic that may select only the sentences that are prefixed by the agent's channel, for example, ch_2 in the above example. In some cases, a particular channel assigned to the agent may be unknown because the transcript of the communication may not clearly identify which channel belongs to which caller or it may be ambiguous which caller is the agent and which caller is the customer.

In such a case, an agent text classification may be executed against each utterance, as shown at step 306, and as discussed below. For each utterance, an utterance category and a channel are identified. In accordance with some embodiments, the meaning of the utterances may be identified in order to determine the proper channel of the agent. In a typical call center environment, agents are required to use formal communications and specific terms in order to be legally compliant with rules and regulations. For example, in a financial institution, agents may be required to say 'percentage yield' instead of 'the yield' while describing a financial product. In the medical industry, the agents may be required to preface their disclosure of certain medical information with standard legal terms. These utterance standards create a patterned landscape that helps the system gauge and categorize the intent and meaning of the utterance. This categorization of intent is called an Agent Text Classification. As an example, a salutation by an agent for a given organization may show up in a certain pattern across the calls handled by that organization, and such utterances may be identified as belonging to the agent.salutation Agent Utterance category.

The following table shows a few examples of various utterance categories and their corresponding qualifying utterances. These utterance categories and examples are not limiting, and a person of ordinary skill will recognize other utterance categories and examples.

| Agent Utterance Category | Qualifying Utterance |
|---|---|
| agent.salutation | This is :n: on a recorded line how may I brighten your day |
| | Thanks for calling. This is :n: how may I help you today |
| | A great day at :n: how can I help you (Note that the :n: here is the name hidden from the transcripts) |
| agent.acknowledgement | I'm just going to order the checkbook for you |
| | I'll just transfer a :d: dollar lump sum from checking (Note that the :d: here is the amount hidden from the transcripts) |
| | Just to let you know we record our calls for quality and security reasons |
| agent.inquiry | Okay and what type of device are you using for logging in on |
| | All right and how would you like the information delivery um to your email or a cell phone |
| | Okay alright does she have an account with us |
| agent.validation | Can I get your first and last name please |
| | Could you just verify uh last :d: of your social |
| | What's your email address by the way |
| agent.advice | I could show you how to set up that money market |
| | So what are we going to do first is clear out invalid attempts so that they don't give you any issues |
| | For a daily limit, it's generally :d: :d: :d: :d: dollars per day (Note that :d: here is the amount hidden from the transcripts) |

In some embodiments, there may be utterances that are difficult to ascertain whether it was communicated by the agent. For example, such utterances may include short utterances such as 'uh huh,' 'ok,' 'I see,' etc. These utterances may be classified under a category, such as a 'common' category, and may be used to identify and/or ignore such utterances. In addition, in some instances, agents may not use the exact words associated with a qualifying utterance but instead may use words having the same or similar meaning. Accordingly, a search for a qualifying utterance based on specific words may fail. In such instances, a machine learning model may be employed that may perform a search based on a word and its synonyms, as described in more detail with reference to FIG. 5. Additionally, context awareness may be added to the model to assist in understanding the purpose and meaning of utterances. In this way, a plurality of words in various sequences may be searched within the transcript to associate the utterances to a specific utterance category.

In some embodiments, an agent text classification may be further fine-tuned with the help of a system event capture and/or model input from other independent machine learning models. Agents usually work on other systems while talking with customers or other agents. When doing so, event details with their timestamps are captured for every call. Given the event details, further fine-tuning of the agent text classification to identify and target behaviors may be achieved. For example, if the captured event detail information identifies an agent issuing a mail-order of a debit card to the customer, then an agent utterance category such as agent.debit.policy can be employed to determine if the agent uttered what was required before such issuance. In this case, the company policy or legal requirements may instruct agents to verbally confirm the mailing address for added security. In some embodiments, a machine-learning model may be applied to classify every utterance in a given call transcript.

At step 308, a probability of a particular channel having the agent's communication may be determined based on analysis of the utterances in each utterance category. For each utterance category, there may be a set of reserved keywords. These reserved keywords may be counted on each channel, and based on the frequency or total count of the reserved keywords for each utterance category, a probability or a match score may be determined for each channel on an utterance category basis.

In some embodiments, some of the keywords reserved in each utterance category may be uttered by both the agent and the customer. However, on a channel belonging to the agent, a higher number of reserved keywords may be observed. Therefore, the probability or the matching score for each utterance category may be higher on a first channel as opposed to a second channel and therefore the first channel is assigned to the agent.

At step 310, based on the probability or match score of a particular channel having the agent's communication as determined at step 308, a channel with the highest probability of matching score may be designated as the agent's channel. An overall score for each channel may be determined by aggregating the match score for each utterance category.

The following table illustrates how an agent utterance category may be scored for each channel. Here, for each utterance category, a frequency of qualifying utterances over each channel is determined. The table below demonstrates that the agent is communicating on channel 1 because the match scores for each utterance category and in the aggregate are higher for channel 1 as opposed to channel 2.

| Agent Utterance Category | Channel 1 | Channel 2 |
| --- | --- | --- |
| agent.salutation | 0.65 | 0.02 |
| agent.acknowledgement | 0.54 | 0.12 |
| agent.inquiry | 0.34 | 0.23 |
| agent.validation | 0.45 | 0.12 |
| agent.advice | 0.40 | 0.21 |

Stated another way, as shown in the table above, for each utterance category, utterances on channel 1 have a higher matching score compared to the matching score for channel 2. This indicates that the utterances identified on channel 1 include more qualifying utterances associated with words that would be used by an agent. Thus, it may be determined that channel 1 is assigned to the agent.

After the agent channel is correctly identified, and the agent utterances have been categorized, a time gap between those utterances may be recorded as the 'Behavior distance', as discussed above. By way of a non-limiting example, in some embodiments, the behavior distance may be measured with respect to the timestamp emitted by system events and other machine-learning models. Accordingly, system events and the call type may be detected in parallel while the call takes place. The call type may be identified using a machine-learning model that may be either external to the system or internal to the system performing recommendations for an agent's behavior improvement.

Based on the above, an automatic recommendation system, according to some embodiments, has significant advantages over a manual recommendation system. For example, the automatic recommendation system may be applied to the entire call corpus and in real-time. On the other hand, the manual recommendation system may only cover a finite number of calls, and a random sample may be used to represent the entire call corpus. In addition, the automatic recommendation system may provide correction recommendations in real-time, whereas the manual recommendation system may require a substantial delay between analysis of the transcripts and recommendations for behavior change to the agent. Further, the automatic recommendation system is scalable and offers cost-saving features with cloud-based infrastructure in comparison to the manual recommendation system.

Figure 4:
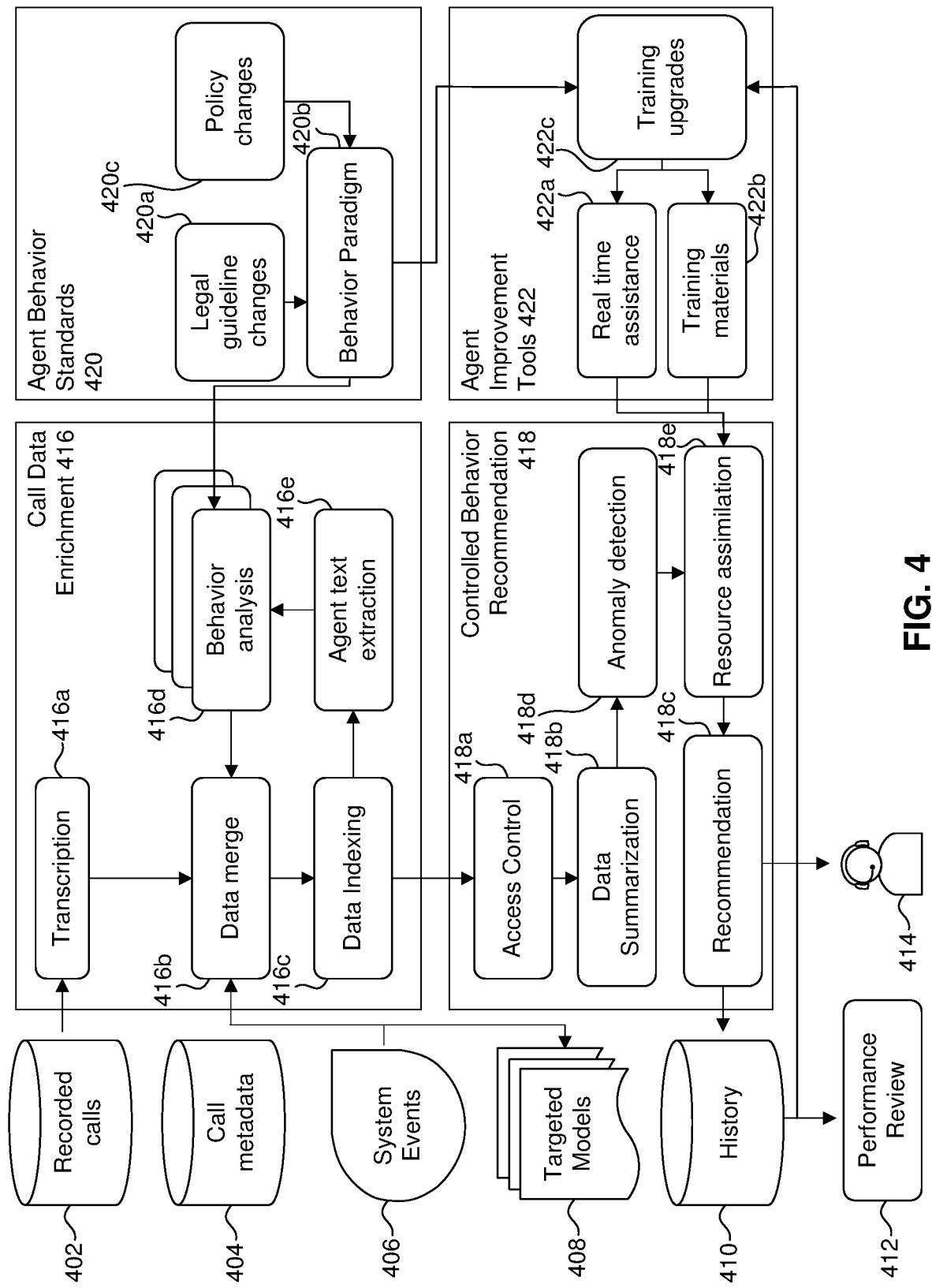
FIG. 4 illustrates an architecture diagram of an example automated agent behavior recommendation system, according to some embodiments.

FIG. 4 illustrates an architecture diagram of an example automated agent behavior recommendation system, according to some embodiments. By way of a non-limiting example, the automated behavior recommendation system may be implemented such that specific agent behaviors may be evaluated and presented to the agent in real-time. The user in control of the system may be called 'the end-user.' The system shown in FIG. 4 may be divided into four major blocks: call data enrichment module 416, agent behavior standards module 420, agent improvement tools module 422, and controlled behavior recommendation module 418. Each of these blocks is described in detail below.

Call Data Enrichment Module 416

Call data enrichment module 416, as its name suggests, enhances available call data records based on a plurality of recorded calls between a plurality of agents and a plurality of customers. The call data enrichment module 416 receives recorded call details stored in a database and generates transcripts for each call. The transcripts and recorded call metadata may then be merged and saved in the database. The merged data then may be indexed so that a database search operation performance may be improved. The indexed data stored in the database may then be extracted to determine an agent utterance category for each utterance. Upon classifying each utterance into a particular utterance category, behavior analysis may be performed for an agent or a group of agents. During the behavior analysis process, a time difference between two utterance categories may be determined that signifies how quickly the agent resolved the customer's problem. The utterance category as determined for each utterance may also be merged with the data stored in the database, so that a search based on the utterance category may be performed. Various submodules of the call data enrichment 416 are discussed in detail below.

In accordance with some embodiments, as soon a call is recorded and made available in the recorded calls storage 402, transcription-based mechanism 416a transcribes the call to text. For example, audio of the call is converted into a transcribed text version of the call. Additionally, data merge mechanism 416b merges the transcription with associated metadata. This allows for the retrieval of transcription via the metadata. Furthermore, data merge mechanism 416b may also merge system events information 406 and targeted models information 408 with the transcription and metadata. The system is configured to detect the actions/events performed by the agents during a call with the customer, along with the time that said actions/events occur. For example, events such as approval for debit card issuance, address change, account ownership change, etc., may be recorded along with the time when they occurred. This information may be made available for every call via system events 406. Targeted models 408 may also extract contextual information from the text of the call and mark the overall call with relevant and meaningful identifying information. This information may be made available for every call via targeted models information 408. For example, a call topic derivation model may categorize the call as a certain call type(s) and assign the category to the call as part of the data merge process. These categorizations from the different models may provide behavior analysis at multiple levels. As shown in FIG. 4, recorded calls 402 may be stored in a first database, and associated call metadata 404 may be stored in a second database. By way of a non-limiting example, the first database and the second database may be the same database. The first database or the second database may be cloud-based or a local database. System events 406 may be generated automatically based on the actions taken by the agent and/or the customer during the call. The system events 406 may also be stored in the database 404 with call metadata for the corresponding call.

Once all of the data, including recorded calls 402, call metadata 404, system events 406, and targeted models 408, are merged via data merge 416b, the merged data may be indexed by data indexing process 416c to enable a search based on keywords. A person skilled in the art may recognize that the indexed data may be searched more efficiently and quickly. The data may be indexed and thus search based on an utterance category, channel number, and system events, etc. The agent text extraction process 416e may then perform text extraction based on the indexed data by performing a database search. In the agent text extraction process, data is analyzed to identify agent utterance categories for an agent. Behavior analysis modules 416d, to determine a time difference between two utterance categories, may then analyze the extracted and classified utterances according to utterance categories. Each of these behavior analysis modules may work depending upon the behavior being targeted. Some of the examples of the behaviors that may be targeted based on the call transcript are listed below:

Time taken to greet the caller

Repeated requests and inquiry

Time taken between acknowledging a problem and advice for the same while not transferring the call. For example, independently and efficiently servicing the customer In addition to the above, based on the system events and targeted model output to the transcripts, the following behaviors may be assessed:

If a debit card was sent to the customer, did the agent perform verbal verification of the new and latest address?

If this call was categorized as a balance inquiry, did the agent educate the customer over the call to self-service in the future?

The call data enrichment 416 may include the following components described in detail below.

Behavior Analysis Module 416*d*

The Behavior analysis module may use a layered approach when analyzing an agent's performance. The end-user may utilize a combination of text search, system events, and other metadata related fields to filter out and extract a targeted behavior. The targeted behavior is the utterance category for which the agent's performance may require analysis and/or improvement. If the behavior cannot be extracted using a search including the combination of keywords, call metadata 404 and system events 406, the end-user may instantiate machine learning target models 408 that may further help to extract a target behavior with or without the use of keywords, system events 406 or call metadata 404 based filters. A detailed description of the behavior analysis module 416*d* processing is discussed below with respect to FIG. 5.

Agent Behavior Standards Module 420

The agent behavior standards module 420 defines the recommended behavior paradigm 420*b* based on legal guidelines 420*a* and corporate policies 420*c*. The agent behavior recommendations may be influenced by legal guideline changes 420*a* and/or corporate policy changes 420*c*. For example, while a call between an agent and a customer takes place, the agent's performance may be measured based on information received from agent behavior standards module 420. Company policies 420*c* and Legal guidelines 420*a* may define what the agent should utter in a given situation or what action should be performed based on corporate guidelines and/or the law. For example, legal guidelines 420*a* may define what an agent is legally required to say or do based on certain situations that may arise during the call. In a similar vein, company policies 420 may define what an agent is required to say or do based on corporate guidelines. For example, when describing the performance of a financial product, the agent may be required to utter the phrase 'percentage yield' instead of 'yield.' Other examples of behaviors that are assessed based on legal guidelines 420*a* and company policies 420*c* may include:

If a debit card was sent to the customer, did the agent acquire verbal consent specific to the state law?

If this call was categorized as a balance inquiry and the customer was disabled and is not in a position to self-service, did the agent proactively service the customer's needs with empathy?

The agent behavior standards information can be used along with the transcription data to provide information to agent improvement tools 422. This information, as will be discussed below, can be used to provide real-time assistance and training materials to improve an agent's performance for any kind of situation that may arise during a call.

Controlled Behavior Recommendation Module 418

The controlled behavior recommendation module 418 may provide controlled access to the training materials and real-time assistance from the agent improvement tools 422, in addition to access to the indexed data stored in the database via data indexing 416*c*. The controlled behavior recommendation module 418 may include a plurality of submodules, for example, access control 418*a*, data summarization 418*b*, anomaly detection 418*d*, resource assimilation 418*e*, and recommendation 418*c*—each of which is described in detail below.

The extracted data from behavior analysis processes, including the call data enrichment 416, the agent behavior standards 420, and the agent improvement process 422, may be integrated with the call information as metadata such that they are made jointly searchable. This merged data set may be presented to the agents in an access-controlled way, as shown in FIG. 4 as 418*a*. In this way, the dataset may be available to authorized persons and/or only specific sections of the merged data may be accessible.

Data may be summarized in real-time for the particular agent that is accessing the recommendation system, as shown in FIG. 4 as 418*b*. The summarization process aggregates aspects specific to the targeted behaviors. This summarization gives way to anomaly detection in a way that may help with agent performance assessment—for example, surfacing the behaviors where a given agent scored in a lower percentile. Anomaly detection 418*d* may assess the results from the summarization process and trigger the resource assimilation process 418*e* for the concerning behaviors. The resource assimilation process may look at articles in the training system that can improve the specific behavior. The system may also engage the coach in real-time if that is the best course of action mapped for that particular behavior. The agent may then be presented with the recommendation 418*c* for whatever path is deemed fit for that specific behavior. The associated metric for that behavior may be tracked against that agent in a separate index, which may be the key part of that agent's overall performance. The aggregation of associated behavior metrics may be provided to the training update process. For example, the most common pitfalls for agents may be highlighted, such that those training materials may be further improved. The recommendation for the agent 414 may be stored in a history database 410 and may be used for performance review 412 as well as for determining any training updates required, as shown in FIG. 4 as 422*c*.

Agent Improvement Tools Module 422

Agent improvement tools module 422 provides recommendations to the agent according to the agent behavior standards 420. As stated above, the agent behavior recommendations generated by the behavior paradigm standards 420*b* are provided as an input to the agent improvement tools 422. The agent improvement tools 422 may provide training materials and real-time assistance according to the agent behavior recommendations.

Agent improvement tools module 422, as shown in FIG. 4, may include real-time assistance 422*a*, training materials 422*b*, and training upgrades 422*c*. The real-time assistance 422*a* and training materials 422*b* may be leveraged offline. The training upgrades 422*c* may provide updated or upgraded training materials in accordance with the agent behavior recommendations based on the updated policy changes and/or any legal guideline changes. Accordingly, real-time assistance 422*a* and the training materials 422*b* may provide real-time assistance to the agent and corresponding training materials, respectively, based on input from the training upgrades 422c.

Real-time assistance 422a may help in reducing negative customer impact due to a lack of agent knowledge. It may also help reduce onboarding time as agents can learn on-the-job and absorb more rapid changes in the realm of legal guidelines and company policy changes. Non-limiting examples of real-time assistance that may be built into the system includes:

Sending an alert to the right groups of coaches or trainers who can assist the agents and are in the vicinity of the agents. Such coaches or trainers, equipped with the right context of the call, can help the agents with improving their performance.

Allowing for a coach to claim the assistance request in real-time.

Sending the agent location with the request such that the coach may be physically present with the agent for assistance.

Providing a mobile-friendly interface to the coach such that they may be productive in transit.

In some embodiments, training upgrades may be made in parallel based on popular recommendations. Coach skill adjustment may be driven by the popular recommendations, which may add to improvements in real-time assistance. The recent legal guidelines 420a and company policy changes 420c may be absorbed in the form of specific agent behavior expectations or recommended behavior 420b during specific situations.

While in the above sections, behavior analysis may be performed based on using keywords or a text search, in some embodiments, the behavior analysis process may be performed using machine learning models. The machine learning models may be provided for performing analysis based on various utterance categories. The machine learning models may also determine utterance categories for each utterance based on one or more sets of keywords and a particular sequence in which the keywords may appear in the utterances. The machine learning models may also provide a more efficient solution for the behavior analysis.

Figure 5:
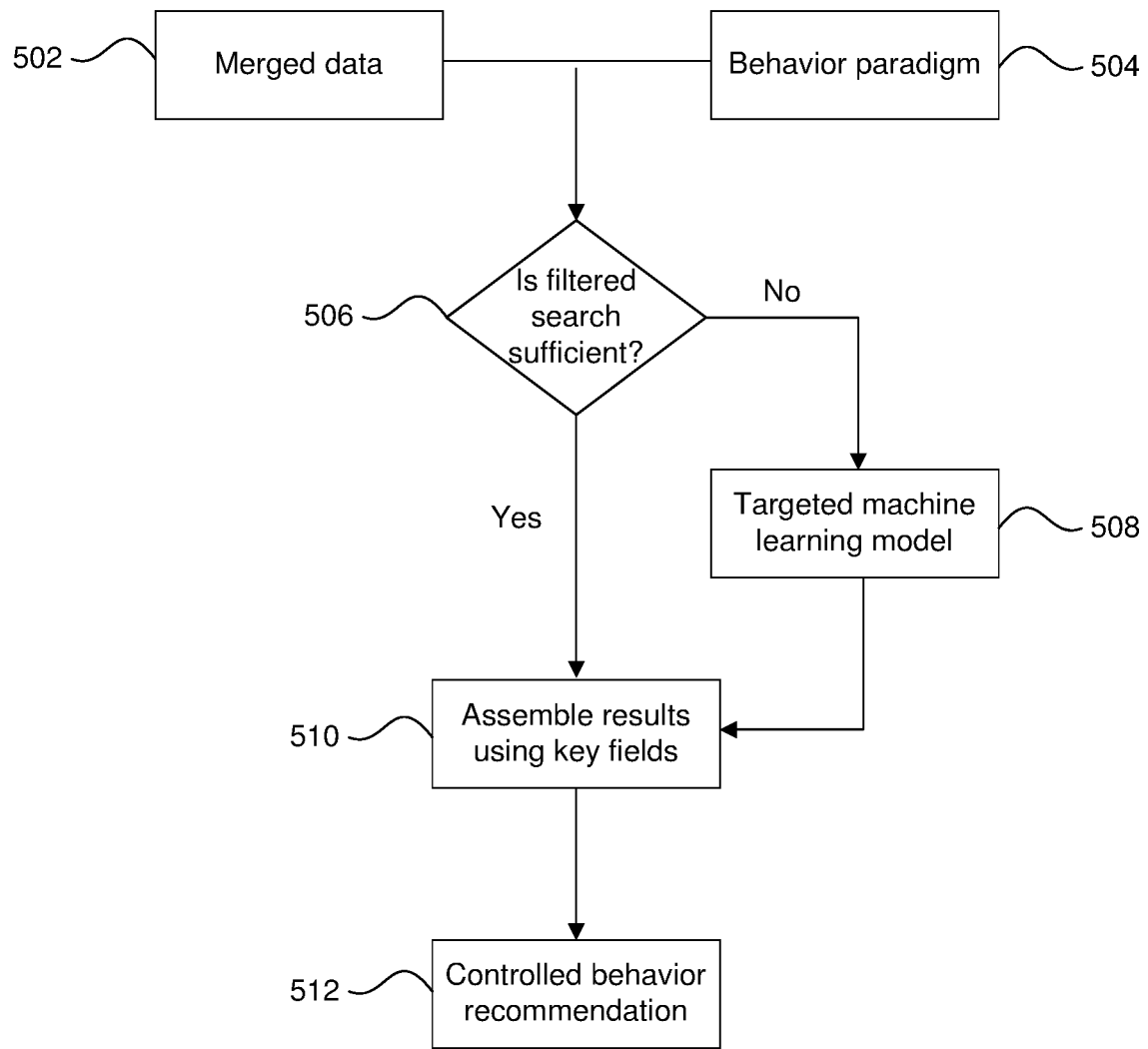
FIG. 5 illustrates a decision flow chart for deriving behavior recommendations, according to some embodiments.

FIG. 5 illustrates a flow chart for performing a behavior analysis, in accordance with some embodiments. As discussed above, a behavior analysis can be performed by behavior analysis module 416d. Behavior analysis module 416d may utilize information from one or more independently running machine learning models, such as targeted machine learning model 508, as described with reference to targeted models 408 above, to perform behavior analysis for one or more particular behavior utterance categories. The one or more particular behavior utterance categories may be specified by a behavior paradigm. In some embodiments, the end-user of the system may instantiate new behavior-sensitive models, without the help of a data scientist or a software engineer. Accordingly, creating a new model instance specific to the analysis of a specific utterance category is in the end-user's control (i.e., creating the new model instance process may not require software engineering skills).

Merged data 502 includes information such as recorded calls 402, call metadata 404, and system events 406, as described above with reference to FIG. 4. The merged data 502 may be searched using a keyword search for a classification of the utterances into various utterance categories. Behavior paradigm 504 may indicate the behavior of the agent that is being analyzed and reviewed for an automated recommendation. Based on the merged data 502 and the behavior paradigm 504, a user may search for specific key words or phrases associated with the behavior paradigm 504 so that agent utterances can be classified into their appropriate utterance categories.

The behavior paradigm 504 may be represented in the form of JavaScript Object Notation (JSON) objects that allow the model to filter the agent communication, including call transcripts, chats, emails, etc., such that the machine learning model may target those communication instances. For example, the behavior paradigm 504 may specify that the agent is required to guide the customer to add beneficiaries to their accounts by themselves online unless the customer is from specific states where self-service is not allowed. By way of a non-limiting example, the relevant behavior paradigm variables for the model may be the customer's residence states, such as NY or NH, and system events that identify beneficiary related servicing, such as a beneficiary inquiry. Another example of a behavior paradigm 504 may be policy-related, where the end-user wants to analyze the behavior of agents specific to the firm's products. For example, for a bank, the agent may be required to describe the yield of an account by saying the term annual percentage yield where applicable. The relevant variables specified to the model here may be the product identifier, such as the cash deposit account, the utterance identifier, such as annual percentage yield, and the utterance context, such as a product inquiry.

The behavior paradigm 504 may allow the model to target communications where the relevant variables are applicable. The end-user may begin choosing sample behavior traces, such as utterances in calls, email references, and/or chat responses, from the user interface. These behavior traces may fall within that behavior paradigm and may help the model learn about the right or wrong behavior within that specific behavior paradigm.

At 506, a decision may be made regarding the search based on the key terms. Results produced based on the key terms based on search may be determined for their sufficiency. If all the utterances may be classified into their appropriate utterance categories using a search based on key terms, at step 506, it may be determined that the filtered search is sufficient. Accordingly, the use of the targeted machine learning model 508 may not be required, and the search may be deemed sufficient. In this case, the process flow progresses to step 510.

At step 510, the results based on the key search terms may be assembled. The results based on the key search terms for a specific agent based on a plurality of calls with a plurality of customers may be assembled for generating a behavior recommendation at step 512. Since the behavior recommendations are generated based on the plurality of calls, the accuracy of the behavior recommendations may be improved.

At step 506, if determined that the search based on key terms does not produce sufficient results, a machine learning model 508 may be employed. By way of a non-limiting example, the machine learning model 508 may be a semi-trained machine learning model, which uses a mix of supervised and unsupervised machine learning models. In the following sections, machine learning models are described in detail.

Machine Learning Models

In the following paragraphs, the new model instance creation process, background information, and benefits are described in detail. In an example, if the end-user wants to create a behavior model instance for sensing how agents should correctly acquire verbal consent from the customer, the end-user would choose such utterances from a user interface and mark the utterances for the model instance, i.e., a specific machine learning model, to utilize and learn from. These marked communication patterns then become a more fine-tuned layer of criteria for qualified behavior. Model training may be triggered as soon as the end-user marks enough samples.

By way of a non-limiting example, the first layer of the model architecture may decide how the model learns so it can be trained. The next layer may be a language layer that comprises embeddings specific to the language. An embedding is a relatively low dimensional space in which high dimensional vectors may be translated. Embeddings make it easier to perform machine learning based on large data. The language layer may contain embeddings from the business domain-specific terminology on top of a specific language. This layer thus may help the model to understand the agent utterances and may prioritize certain words or word groupings over others depending on the business. The model trained to include these two layers and stored in this state may be called a semi-trained model template, because while it is trained, it is not ready for use unless trained with more fine-grained and targeted samples.

In an embodiment, the end-user, i.e., the person in charge of the analysis of the agent's behavior, may create a behavior model instance. The behavior model instance may use a specific machine learning model to analyze a particular agent utterance category. The behavior model instance may be created using a behavior model request user interface. Using the behavior model request user interface, the end-user may choose the semi-trained model that may specify one or more fields in which the trained model may emit a score corresponding to the relevant behavior paradigm from agent behavior standards 420. In accordance with some embodiments, the semi-trained model may be created based on a semi-trained model template, which may include one or more layers that form the basis of other variations in the machine learning process of the behavior assessment. Further details regarding the semi-trained model is discussed below.

In accordance with some embodiments, the trained model may start acting on a targeted communication corpus, i.e., a set of call data records, as soon as training is completed. The targeted communication corpus may be derived with the help of the behavior paradigm chosen for the model. The behavior assessment process may then generate scores for utterances, as described above. The generated score may be higher when the resemblance of the sample behavior in a targeted communication corpus is higher. In addition, the scores may also depend upon the consistency, quality, and quantity of samples the end-user could provide.

The machine learning model may act on the subset of data or the entire data set without the need to build another environment, which may be advantageous because the data size for such tasks is often huge.

The machine learning models may be targeted to act on calls, or other communication mediums like chat, emails, etc., that have certain specific system events paired with them. For example, an address change consent acquisition behavior may be targeted when the address change occurs during that call, which may be detected by the system event.

By way of a non-limiting example, models may be of different sizes. The behavior may be targeted towards the corpus defined by the behavior paradigm that makes the use of larger, more compute-intensive models practical because targeted behaviors may be known in advance. As a result, the balance between the accuracy and efficiency of a given behavior analysis may remain in the hands of the end-user.

The end-user may continue enriching the model even after the model output release phase. Accordingly, each model output release may include field names assigned a different version number to which the new upgraded model may emit the results. The end-user may have control over the field creation and edit process, and these fields may be at the level of every call or any other communication instance—chat, email, etc.

Semi-Trained Model Template

As discussed above, in an embodiment, the end user, when ready to create a behavior model instance may use a semi-trained model template. The semi-trained model template is referred to as a manifestation of a model ensemble that satisfies a number of conditions. In an embodiment, the semi-trained model may include, or may be trained to include, language embeddings that represent the same language that the corpus, including the behaviors, will be assessed against—English embeddings for an English corpus, Spanish embeddings for a Spanish corpus, etc. Language embeddings used for the semi-trained templates may be created such that said embeddings may be repeatedly fine-tuned or trained upon. In the scenario where multiple languages are used to assess agent behavior, multiple machine learning model templates may be used such that the end-user may choose the correct semi-trained model template per behavior and per language to build upon. In an embodiment, the semi-trained machine learning model template may be re-usable for multiple behavior model generations. The semi-trained model template may be stored in a serialized state, and a copy of the model template may be deserialized to build upon the usable model. Further, the semi-trained model template may specify the stipulated technique in its package as a dependency to improve the performance as soon as the model is ready for inference (i.e., after training).

By way of a non-limiting example, the semi-trained model template may be created using state of the art multi-head attention layers for a language. The semi-trained model template is further trained using a specific target corpus for a given industry for which the semi-trained model is being generated. An additional layer is employed to provide a threshold specific scoring such that a scale of behavior matches may be provided to the end-user. For example, a scale of behavior match value of 1 suggests the lowest match and 10 suggests the best match may help the end-user to fine-tune their behavior sample and trigger a retrain of the semi-trained model or just use the results sorted by the output of the semi-trained model.

By way of a non-limiting example, the semi-trained model template may be created using standard machine learning techniques that do not employ deep learning. Such techniques are useful when the sample behaviors include words that are not context-sensitive and do not have many variations, such as behaviors involving the presence of legal terms, verbal consent to be sought, etc. The machine learning models based on the semi-trained model templates using standard machine learning techniques may not be as computation-intensive. Thus, the models need not undergo any change for computation performance improvement after training.

In some embodiments, multiple semi-trained models may be made available. These templates may vary in the language they support, and the machine learning algorithm is employed based on the scale of flexibility provided in terms of sample accuracy, and the computation power required for running. The end-user may choose to build off of a template depending upon the behavior paradigm and the severity of the behavior deviation. In an embodiment, the semi-trained models may be language-specific. This means the user may target behaviors for any language the model template is available in. Out of multiple semi-trained models made available, a specific model may be chosen based on the behavior that is being reviewed and analyzed.

The end-user may rely on the following guidelines to choose a correct machine learning model. A correctly chosen machine learning model may increase efficiency and performance.

| Solution Design Strategy | Behavior Characteristic |
| --- | --- |
| Large model templates may be required due to context-sensitivity | Same behaviors have too many generic words, or context-sensitive words are far apart |
| Large or medium-sized model templates may be required | Sample behaviors are scarce |
| Explore keyword search usage first. Smaller, non-deep-learning-based model templates may be used for further fine-tuned results | Sample behaviors have fewer and specific words |
| Use the target fields from dependent behaviors in combination with current behavior field | Sample behavior is dependent on another behavior |

In some embodiments, the behavior analysis may be improved by allowing the end-user to daisy chain the behaviors. The end-user may specify behaviors in response to another behavior. The model may be trained on finding representations of all the behaviors in the chain and return an aggregated score. For example, the first behavior may be "Did the agent seek permission to send a one-time passcode to the customer?" and the second behavior, may be "after the customer consent, did the agent confirm the number with the customer?" The end-user may specify such behavior chains as a configurable option.

Transcription Quality Improvement

The transcripts are one of the critical pieces of the behavior recommendation system for audio-based channels. Therefore, the quality of transcribing multiple phone conversations needs to be kept in check. Over the period, the transcription model (that converts audio to text) may start deviating from the quality standards it was approved against. There may be new words being introduced in the audio, or the current population of speakers in the audio may just be too diverse, and the transcription quality may take a downturn. Most businesses manually transcribe a sample of calls and measure the deviation in quality against the transcription from the model for the same calls at a given point in time to combat this problem.

In accordance with some embodiments, the system may provide support to keep the audio transcription quality in check and also help in improving the transcription quality. Tools necessary to support such manual transcription and measure the deviation in transcription quality may be provided by the system.

In accordance with some embodiments, the system may provide an access controlled audio stream to the person that will be listening to the audio and transcribing the audio. The audio may be relayed in a way that is most conducive to listen and transcribe. Real-time buffering may allow the transcriber to pause the audio flow, properly finish typing in what they listened to in the past few seconds, and continue listening further. Simple controls may allow one to listen to one channel at a time and tune-in to a given accent and type out what was meant by that person. The transcriber need not maintain the timestamps in milliseconds during which the utterance took place. The system may do it for the transcriber, and the transcriber just has to type in as he/she hears in the sections where the transcript needs to be.

In accordance with some embodiments, the system may remove the sensitive information from this manually created transcript. This makes the manual transcripts resemble the automated transcripts more closely, and it helps in comparing the two. During the entire process, the audio may not be stored anywhere. The audio may be simply streamed in small parts. That way, the security of the content in audio may not be compromised because it has minimal footprint during transit. Securing the audio content is important because it contains a customer's sensitive information.

By way of a non-limiting example, the same audio stream may be sent through the transcription model, and a transcript is created for that same voice conversation. The two transcripts may be matched and run through the transcription accuracy standards as part of a process that performs quality difference check. This process may differ based on the implementation and the area of anomaly that needs focus. One way of carrying-out the quality difference check is to perform a Word Error Rate calculation that measures the degree of deviation of the model-based transcription from the manual transcription. The manual transcriptions may be considered as the standard. The word error rate for every call may be considered in calculating an average of the deviation across these calls. The more calls that are compared, the more the deviation may resemble the degree to which the transcription model may need to be retrained. The threshold within which the model may operate may be agreed upon in advance, and hence the deviation may result from the basis of deciding whether or not to retrain the transcription model.

In accordance with some embodiments, unaltered manual transcripts may be provided to the process that would retrain the model. This would bring the model to the current human standards, and this can be done by initiating the retraining just as if the end-user retrains the behavior analysis model in the absence of a data scientist or engineer.

Figure 6:
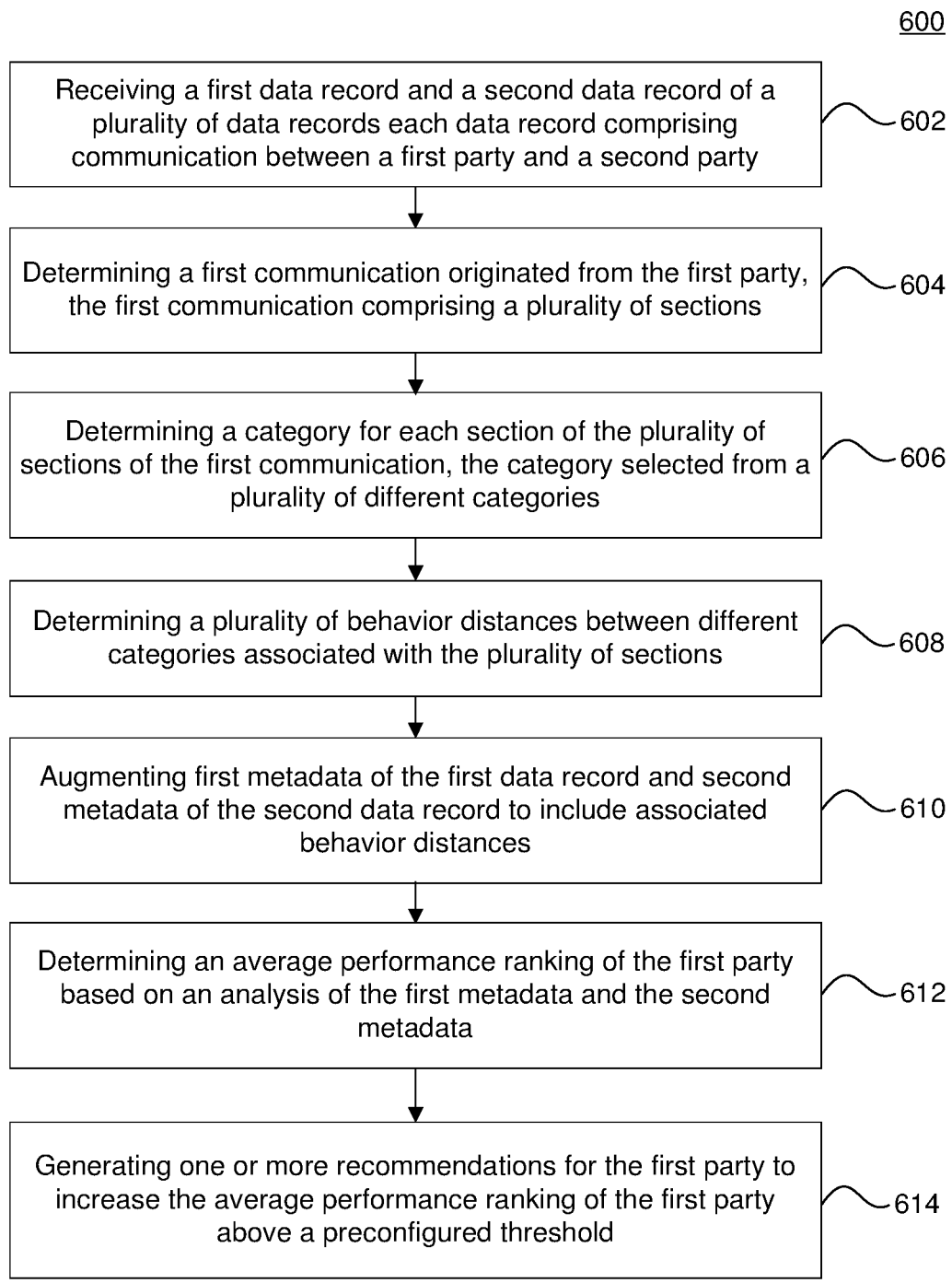
FIG. 6 illustrates a flow chart for automated agent behavior recommendations, according to some embodiments.

FIG. 6 illustrates a flow chart of steps for automated agent behavior recommendation, according to some embodiments. The flow chart 600 may start at 602, at which a first data record and a second data record of a plurality of data records may be received at a server. Each data record may include communication between a first party and a second party. The first party may be an agent or a call center associate, and the second party may be a customer. The first data record and the second data record each may include a start time and an end time of an event from a set of events. The set of events may include spoken or written communication between the agent and the customer, and may be in the form of a voice call, a text message, an email, an internet chat message, etc. The first data record may correspond to a first call, and the second data record may correspond to a second call handled by the agent.

At step 604, a first communication originated from the first party may be determined. As described above, there may be two channels, and one of the channels may be assigned to the first party, i.e., the agent. If the channel assigned to the agent is known, then the communication occurring on that channel may be identified as the communication originated by the agent. If the channel assigned to the agent is unknown, then the channel may be identified by classifying each spoken or written word of a plurality of spoken or written words exchanged between the agent and the customer. The plurality of spoken or written words may be exchanged over more than one channel. Based on the analysis of the plurality of spoken or written words exchanged between the agent and the customer for a predetermined set of words, a communication channel assigned to the agent may be determined when the frequency of the predetermined set of words found in a particular channel exceeds a predetermined threshold value.

At step 606, a category for each section of the plurality of sections of the first communication may be determined. As stated above, the utterances in the first communication may correspond to a category of a plurality of categories, which may include a salutation by the agent (agent.salutation), an acknowledgment by the agent (agent.acknowledgement), an inquiry by the agent (agent.inquiry), validation by the agent (agent.validation), and advice by the agent (agent.advice), etc. As described above, the category for each section of the plurality of sections of the first communication may be identified by keyword search. By way of a non-limiting example, a machine learning model may also be employed to identify a category for each section of the plurality of sections of the first communication.

At step 608, one or more behavior distances between different categories associated with the plurality of sections may be determined. As described above, each utterance may have a corresponding start time and end time. The start time and end time may be represented in milliseconds or other time units. Based on the start time and end time of the utterances associated with a category, the behavior distance as a measure of time may be determined for more than one call handled by the agent. At step 610, the determined behavior distances may be stored as metadata of each of the corresponding calls between the agent and the customer.

At 612, based on an analysis of the behavior distances stored as metadata for each call handled by the agent, an average performance ranking of the agent may be determined for various utterance categories. While determining the average performance ranking of the agent, various policies associated with a set of organizational or legal guidelines may be considered. If the average performance ranking is below a preconfigured performance threshold level, at step 614, one or more recommendations for the agent may be generated to increase the agent's performance. Accordingly, training materials may be provided to the agent based on the generated recommendations. The recommendations to the agent may be generated in real-time while the call is ongoing or at the end of the call.

Figure 7:
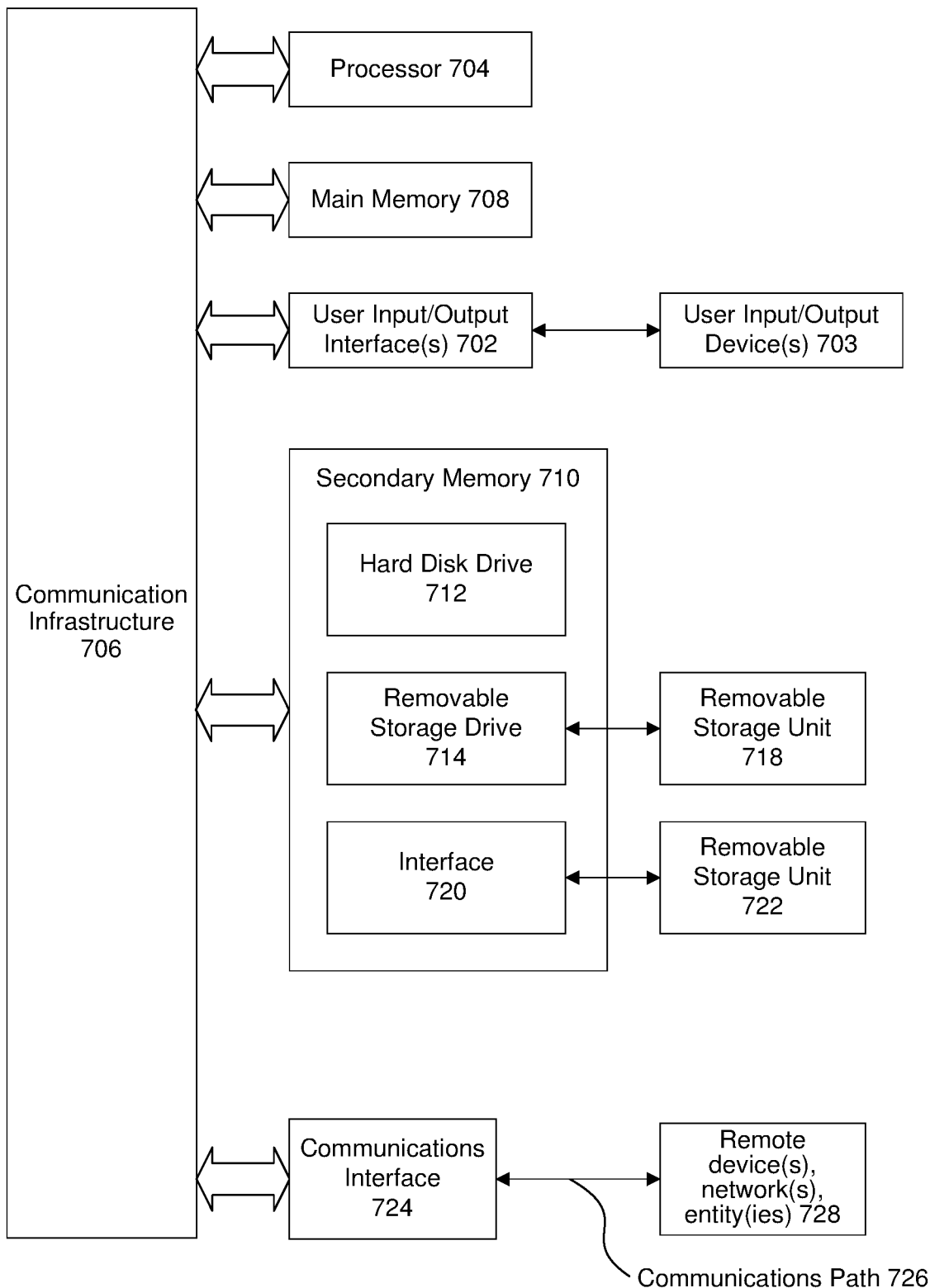
FIG. 7 illustrates an example computer system, according to some embodiments.

FIG. 7 illustrates an example computer system in accordance with some embodiments.

Various embodiments may be implemented, for example, using one or more well-known computer systems, such as a computer system 700, as shown in FIG. 7. One or more computer systems 700 may be used, for example, to implement any of the embodiments discussed herein, as well as combinations and sub-combinations thereof. The computer systems 700 may be used for the implementation of one or more embodiments described above.

The computer system 700 may include one or more processors (also called central processing units, or CPUs), such as a processor 704. The processor 704 may be connected to a communication infrastructure or bus 706.

The computer system 700 may also include user input/output device(s) 703, such as monitors, keyboards, pointing devices, etc., which may communicate with communication infrastructure 706 through user input/output interface(s) 702.

One or more processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

The computer system 700 may also include a main or primary memory 708, such as random access memory (RAM). Main memory 708 may include one or more levels of cache. Main memory 708 may have stored therein control logic (i.e., computer software) and/or data.

The computer system 700 may also include one or more secondary storage devices or memory 710. The secondary memory 710 may include, for example, a hard disk drive 712 and/or a removable storage device or drive 714. The removable storage drive 714 may be a floppy disk drive, a magnetic tape drive, a compact disk drive, an optical storage device, tape backup device, and/or any other storage device or storage drive.

The removable storage drive 714 may interact with a removable storage unit 718. The removable storage unit 718 may include a computer-usable or readable storage device having stored thereon computer software (control logic) and/or data. The removable storage unit 718 may be a floppy disk, magnetic tape, compact disk, DVD, optical storage disk, and/or any other computer data storage device. The removable storage drive 714 may read from and/or write to the removable storage unit 718.

The secondary memory 710 may include other means, devices, components, instrumentalities, or other approaches for allowing computer programs and/or other instructions and/or data to be accessed by the computer system 700. Such means, devices, components, instrumentalities, or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

The computer system 700 may further include a communication or network interface 724. The communication interface 724 may enable the computer system 700 to communicate and interact with any combination of external devices, external networks, external entities, etc. (individually and collectively referenced by reference number 728). For example, the communication interface 724 may allow the computer system 700 to communicate with the external or remote devices 728 over communications path 726, which may be wired and/or wireless (or a combination thereof), and which may include any combination of LANs, WANs, the Internet, etc. Control logic and/or data may be transmitted to and from the computer system 700 via the communication path 726.

The computer system 700 may also be any of a personal digital assistant (PDA), desktop workstation, laptop or notebook computer, netbook, tablet, smartphone, smartwatch or another wearable, appliance, part of the Internet-of-Things, and/or embedded system, to name a few non-limiting examples, or any combination thereof.

The computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in the computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, or schemas may be used, either exclusively or in combination with known or open standards.

In accordance with some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, the computer system 700, the main memory 708, the secondary memory 710, and the removable storage units 718 and 722, as well as tangible articles of manufacture embodying any combination of the foregoing. Such control logic, when executed by one or more data processing devices (such as the computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

What is claimed is:

1. A method, comprising:
receiving, at a server, a first data record and a second data record of a plurality of data records, each data record comprising communication between a first party and a second party;
determining, at the server, a first communication originating from the first party, the first communication comprising a plurality of sections;
determining, at the server, a category for each section of the plurality of sections of the first communication, the category selected from a plurality of different categories;
determining, at the server, a plurality of behavior distances between the plurality of different categories associated with the plurality of sections;
augmenting, by the server, first metadata of the first data record and second metadata of the second data record to include associated behavior distances;
determining, at the server, an average performance ranking of the first party based on analysis of the first metadata and the second metadata; and
generating, at the server, one or more recommendations for the first party to increase the average performance ranking of the first party above a preconfigured threshold.

2. The method of claim 1, wherein the first data record or the second data record comprises a start time and an end time of an event from a set of events comprising spoken or written communication between the first party and the second party.

3. The method of claim 1, wherein determining the first communication originating from the first party further comprises:
determining availability of a communication channel for the first party in the first data record or the second data record;
in response to determining that the communication channel for the first party is unavailable in the first data record or the second data record, classifying each spoken or written word of a plurality of spoken or written words exchanged between the first party and the second party, wherein the plurality of spoken or written words are exchanged over a plurality of communication channels;
determining a channel of the plurality of communication channels, over which a number of spoken or written words identifies the first party based on a predetermined set of words exceeding a predetermined threshold value; and
separating the first communication originating from the first party from a second communication originating from the second party based on the determined channel.

4. The method of claim 1, wherein the plurality of different categories comprises a salutation by the first party, an acknowledgment by the first party, an inquiry by the first party, validation by the first party, or advice by the first party.

5. The method of claim 1, wherein determining the category for each section further comprises:
using a machine-learning model to identify the category for each section of the plurality of sections.

6. The method of claim 1, wherein determining the average performance ranking of the first part further comprises:
analyzing the first metadata and the second metadata based on a policy associated with a set of organizational guidelines.

7. The method of claim 1, further comprising:
facilitating, by the server, training material for the first party, wherein the training material corresponds to the one or more recommendations generated for the first party to increase the average performance ranking of the first party above the preconfigured threshold.

8. An application server, comprising:
a memory for storing operations; and
one or more processors, communicatively coupled to the memory, configured to perform the operations comprising:
receiving a first data record and a second data record of a plurality of data records, each data record comprising communication between a first party and a second party;
determining a first communication originating from the first party, the first communication comprising a plurality of sections;
determining a category for each section of the plurality of sections of the first communication, the category selected from a plurality of different categories;
determining a plurality of behavior distances between the plurality of different categories associated with the plurality of sections;
augmenting first metadata of the first data record and second metadata of the second data record to include associated behavior distances;
determining an average performance ranking of the first party based on analysis of the first metadata and the second metadata; and
generating one or more recommendations for the first party to increase the average performance ranking of the first party above a preconfigured threshold.

9. The application server of claim 8, wherein the first data record or the second data record comprises a start time and an end time of an event from a set of events comprising spoken or written communication between the first party and the second party.

10. The application server of claim 8, wherein for determining the first communication originating from the first party, the operations further comprise:
determining availability of a communication channel for the first party in the first data record or the second data record;
in response to determining that the communication channel for the first party is unavailable in the first data record or the second data record, classifying each spoken or written word of a plurality of spoken or written words exchanged between the first party and the second party, wherein the plurality of spoken or written words are exchanged over a plurality of communication channels;
determining a channel of the plurality of communication channels over which a number of spoken or written words identifies the first party based on a predetermined set of words exceeding a predetermined threshold value; and
separating the first communication originating from the first party from a second communication originating from the second party based on the determined channel.

11. The application server of claim 8, wherein the plurality of different categories comprises a salutation by the first party, an acknowledgment by the first party, an inquiry by the first party, validation by the first party, or advice by the first party.

12. The application server of claim 8, wherein for determining the category for each section, the operations further comprise:
using a machine-learning model to identify the category for each section of the plurality of sections.

13. The application server of claim 8, wherein for determining the average performance ranking of the first party, the operations further comprise:
analyzing the first metadata and the second metadata based on a policy associated with a set of organizational guidelines.

14. The application server of claim 8, wherein the operations further comprise:
facilitating training material for the first party, wherein the training material corresponds to the one or more recommendations generated for the first party to increase the average performance ranking of the first party above the preconfigured threshold.

15. A non-transitory, tangible computer-readable device having instructions stored thereon that, when executed by at least one computing device of an application server, causes the at least one computing device to perform operations comprising:
receiving a first data record and a second data record of a plurality of data records, each data record comprising communication between a first party and a second party;
determining a first communication originating from the first party, the first communication comprising a plurality of sections;
determining a category for each section of the plurality of sections of the first communication, the category selected from a plurality of different categories;
determining a plurality of behavior distances between the plurality of different categories associated with the plurality of sections;
augmenting first metadata of the first data record and second metadata of the second data record to include associated behavior distances;
determining an average performance ranking of the first party based on analysis of the first metadata and the second metadata; and
generating one or more recommendations for the first party to increase the average performance ranking of the first party above a preconfigured threshold.

16. The non-transitory, tangible computer-readable device of claim 15, wherein the first data record or the second data record comprises a start time and an end time of an event from a set of events comprising spoken or written communication between the first party and the second party.

17. The non-transitory, tangible computer-readable device of claim 15, wherein for determining the first communication originating from the first party, the operations further comprise:
determining availability of a communication channel for the first party in the first data record or the second data record;
in response to determining that the communication channel for the first party is unavailable in the first data record or the second data record, classifying each spoken or written word of a plurality of spoken or written words exchanged between the first party and the second party, wherein the plurality of spoken or written words are exchanged over a plurality of communication channels;
determining a channel of the plurality of communication channels over which a number of spoken or written words identifies the first party based on a predetermined set of words exceeding a predetermined threshold value; and separating the first communication originating from the first party from a second communication originating from the second party based on the determined channel.

18. The non-transitory, tangible computer-readable device of claim 15, wherein the plurality of different categories comprises a salutation by the first party, an acknowledgment by the first party, an inquiry by the first party, validation by the first party, or advice by the first party.

19. The non-transitory, tangible computer-readable device of claim 15, wherein for determining the category for each section, the operations further comprise:

using a machine-learning model to identify the category for each section of the plurality of sections.

20. The non-transitory, tangible computer-readable device of claim 15, wherein for determining the average performance ranking of the first party, the operations further comprise:

analyzing the first metadata and the second metadata based on a policy associated with a set of organizational guidelines.

\* \* \* \* \*